Patented Oct. 6, 1936                           2,056,596

UNITED STATES PATENT OFFICE 2,056,596

PROCESS FOR THE MANUFACTURE OF SHAPED PRODUCTS

Oskar Walter Becker, Weinheim, Germany, assignor to Carl Freudenberg G. m. b. H., Weinheim Badenia, Germany, a corporation of Germany No Drawing. Application November 7, 1935, Serial No. 48,789. In Germany November 8, 1934

10 Claims. (Cl. 18—57)

This invention relates to a process for the manufacture of shaped products, such as artificial sausage skins, artificial threads, artificial horsehair and membranes from animal fibrous material, obtained for example from animal skin or hide.

It has already been proposed (for example in patent application Serial No. 695,376) to manufacture artificial sausage skins from animal skin or hide, by converting the hide by the action of swelling chemicals and by a mechanical resolving treatment into a plastic mass consisting of swollen fibrous material and extruding this mass through annular nozzles in order to bring it into tubular form.

When employing certain starting materials in the aforesaid process, disturbances frequently occurred in the process of manufacture owing to the formation of constrictions in the supply pipes or in the shaping nozzles, the reason for which was at first not apparent. The products obtained were accordingly non-uniform and of little value.

Similar disturbances were observed in the manufacture of artificial threads by one of the applicant's earlier processes (patent application Serial No. 39,864), which consisted in converting the hide material by treatment with swelling agents and, if necessary, mechanical treatment into a pasty condition and extruding this paste under high pressure through tapering nozzles, the discharge openings of which corresponded in diameter to the cross-sections of the threads to be produced.

Finally, similar disturbances were experienced in the manufacture of shaped products, such as artificial sausage skins, artificial threads or membranes, from hide material obtained in another manner, for example by physical treatment, e. g. by heat, or by biological loosening and subsequent mechanical treatment of the skin.

Numerous experiments carried out by the applicant have shown that the disturbances observed are attributable to too high a content of fat, particularly to the uneven distribution of the fat in the starting materials. Under the influence of the chemical and mechanical treatments deposits are formed in the feed pipes and particularly also in the shaping nozzles and these deposits give rise to constrictions. The fact that deposition often takes place irregularly has proved to be a particularly disturbing factor.

According to this invention it has been found that the hereinbefore described disadvantages may be overcome and that uniform shaped products can be produced from any kind of fat-containing animal fibrous material, provided the fat content of the fibrous hide material is rendered non-detrimental before, during or after its production, in any event before the final shaping operation, for example by reducing the fat content by de-fatting agents known per se or by effecting fine distribution of the fat in the fibrous hide mass with the aid of emulsifiers known per se.

The process of this invention enables varied fat-containing hides and hide parts to be worked up into shaped products. Hide material broken down or disintegrated in any desired manner may be employed as starting material. Thus the hide may be converted by chemical, physical and/or mechanical treatments into a pasty mass, and be treated according to this invention, before, during or after the said conversion, with de-fatting agents or emulsifiers. The mass is then extruded through the shaping nozzles, whereby uniform shaped products are obtained, the operation being entirely free from disturbances.

It has been found that the process of this invention, besides increasing the certainty of manufacture and extending the range of raw materials, is also attended with the considerable advantage that if the fat is removed at any stage in the working up of the hide material, the liming period can be considerably shortened with the result that the hide material is very much less decomposed.

Examples

1. Splits, such as occur in the skiving industry, are freed by centrifuging from the adhering water and dehydrated and de-fatted with acetone in tanks, the acetone being circulated by pumps. The de-swollen material, after removing the acetone by suctional filtration in vacuo and drying, is caused to swell with acid and water in a fulling tank and is then converted by extrusion through nozzles into a fibrous paste, from which threads, artificial horsehair, artificial gut, membranes or other shaped products are prepared by extrusion through suitable nozzles.

2. 100 kgms. of limed skins are freed from lime by washing in a fulling tank and are then brought into contact under movement with 100 kgms. of trichlorethylene for three hours in the fulling tank. The material is then washed three times with water at 25° C. and further worked up to artificial threads as described in Example 1.

3. 100 kgms. of shredded hide material are beaten with 10 kgms. of benzine and 1 kgm. of Turkey red oil for two hours in a reel and the emulsified fat is skimmed off half an hour after the reel has been stopped. The material is then washed with water in the fulling tank, acidified in a mixer and thereafter worked up to artificial gut by extrusion through annular nozzles.

5. A fibrous paste produced from hide material is extruded in the form of ropes from nozzles of 5 mms. diameter, the ropes are then pressed flat between rubber rollers into thin bands and conveyed through acetone, pressed between rollers, again conveyed through acetone and pressed. The resulting product is further worked up into membranes.

6. 100 kgms. of fibrous paste are kneaded in a mixer (Werner-Pfleiderer) with 10 gms. of Turkey red oil and the resulting product is worked up into artificial horsehair as described in Example 1.

What I claim is:

1. In a process for the manufacture of shaped products, which consists in extruding disintegrated and shredded animal fibrous material through shaping nozzles, the improvement which consists in rendering the fat content of the fibrous hide material non-detrimental before the final shaping operation.

2. A process according to claim 1, wherein the fat content of the fibrous material is rendered non-detrimental by treatment with organic de-fatting agents known per se.

3. A process according to claim 1, wherein the fat content of the fibrous material is rendered non-detrimental by treatment with organic de-fatting agents known per se and separating the mixture of fat and de-fatting agent from the fibrous material.

4. A process according to claim 1, wherein the fat content of the fibrous material is rendered non-detrimental by treatment with emulsifiers known per se which are added to the fibrous material.

5. A process according to claim 1, wherein the fat content of the fibrous material is finely distributed in the fibrous material by treatment with emulsifiers known per se which are added to the fibrous material.

6. A process according to claim 1, wherein the fat content of the fibrous material is rendered non-detrimental by treatment with emulsifiers known per se which are added to the fibrous material, and separating the fat emulsion from the fibrous material.

7. A process according to claim 1, wherein the fat content of the fibrous material is rendered non-detrimental before the process of shredding the same.

8. A process according to claim 1, wherein the fat content of the fibrous material is rendered non-detrimental during the process of shredding the same.

9. A process according to claim 1, wherein the fat content of the fibrous material is rendered non-detrimental after the process of shredding the same.

10. In a process for the manufacture of shaped products of the type of sausage skins, artificial threads and membranes, which consists in converting animal fibrous material by treatment with swelling chemicals and mechanical treatment into a swollen fibrous paste and extruding this paste through shaping nozzles, the improvement which consists in rendering the fat content of the fibrous material non-detrimental before the final shaping operation.

OSKAR WALTER BECKER.